(12) United States Patent
Orr

(10) Patent No.: US 8,134,842 B2
(45) Date of Patent: Mar. 13, 2012

(54) SYSTEMS AND METHODS FOR CONVERTING A COMPUTER REAR TRANSITION INPUT/OUTPUT (I/O) TO FRONT PANEL I/O

(75) Inventor: Chris Erwin Orr, Huntsville, AL (US)

(73) Assignee: GE Intellgent Platforms Embedded Systems, Inc., Charlottesville, VA (US)

( * ) Notice: Subject to any disclaimer, the term of this patent is extended or adjusted under 35 U.S.C. 154(b) by 999 days.

(21) Appl. No.: 11/618,235

(22) Filed: Dec. 29, 2006

(65) Prior Publication Data

US 2008/0160790 A1 Jul. 3, 2008

(51) Int. Cl.
*H05K 1/11* (2006.01)
(52) U.S. Cl. ........ 361/784; 361/683; 361/803; 361/826; 439/55
(58) Field of Classification Search .................. 361/683, 361/784, 803, 826; 439/55
See application file for complete search history.

(56) References Cited

U.S. PATENT DOCUMENTS

| 5,536,178 | A | * | 7/1996 | Novelli | 439/74 |
| 5,650,910 | A | * | 7/1997 | Winick et al. | 361/679.6 |
| 5,808,867 | A | * | 9/1998 | Wang | 361/695 |
| 6,224,425 | B1 | * | 5/2001 | Shutter | 439/620.17 |
| 6,305,848 | B1 | * | 10/2001 | Gregory | 385/53 |
| 6,491,526 | B2 | * | 12/2002 | Leman | 439/61 |
| 6,542,952 | B1 | | 4/2003 | Western | |
| 6,700,795 | B1 | * | 3/2004 | Jones et al. | 361/784 |
| 6,768,642 | B2 | | 7/2004 | Hines et al. | |

* cited by examiner

*Primary Examiner* — Yuriy Semenenko
*Assistant Examiner* — Andargie M Aychillhum
(74) *Attorney, Agent, or Firm* — GE Global Patent Operation; Catherine J. Toppin

(57) ABSTRACT

A method for converting a computer rear transition input/output (I/O) to front panel I/O is described. The method includes providing a main board having a first main connector having a first set of pins, and affixing a second main connector having a second set of pins to the main board, where a direction of lengths of the first set of pins is other than parallel to a direction of lengths of the second set of pins.

10 Claims, 8 Drawing Sheets 

SYSTEMS AND METHODS FOR CONVERTING A COMPUTER REAR TRANSITION INPUT/OUTPUT (I/O) TO FRONT PANEL I/O

BACKGROUND OF THE INVENTION

This invention relates generally to computer systems and more particularly to systems and methods for converting a computer rear transition input/output (I/O) to front panel I/O.

Printed circuit boards (PCB) or printed wiring boards (PWB) have been known for many years and may be formed by many techniques, such as, screening, plating, and etching. The boards provide for a compact, structurally robust and easily manufactured electronic circuit structure. In use, discrete electronic components and integrated circuits are affixed to the boards via a host of commonly known techniques. I/O pins are connected to the boards to make connections to other components of an integrated system.

As electronic systems, such as communication systems and data processors, have become more complex, the use of multiple PCBs connected to each other has been implemented. The multiple PCBs are implemented within a chassis. For ease of maintenance and repair, these complex systems have been fabricated in a modular form, often of standardized dimensions.

A prevalent standard for modular circuit packaging is commonly known as the "Versa Module Europa" (VME) which incorporates a number of design standards including those known in the art as Institute of Electrical and Electronic Engineers (IEEE) standard 1101.1, IEEE standard 1101.2, peripheral component interface (PCI) Industrial Computer Manufacturers Group (PICMG) 2.0 Revision 3.0, and IEEE standard 1386.1. Another standard used for modular circuit packaging is compact PCI (CompactPCI®)).

Traditionally, a plurality of I/O signals from VME or CompactPCI® PCBs are routed via a transition module in the chassis to a plurality of I/O connectors. However, a customer that use the VME or CompactPCI® PCBs desire to reduce an area within the chassis that is occupied by the transition module for a variety of reasons. As an example, the chassis may be located in a tank or alternatively in an armored vehicle in which room for the chassis is limited.

BRIEF DESCRIPTION OF THE INVENTION

In one aspect, a method for converting a computer rear transition input/output (I/O) to front panel I/O is described. The method includes providing a main board having a first main connector having a first set of pins, and affixing a second main connector having a second set of pins to the main board, where a direction of lengths of the first set of pins is other than parallel to a direction of lengths of the second set of pins.

In another aspect, a system for converting a computer rear transition input/output (I/O) to front panel I/O is provided. The system includes a main board having a first main connector having a first set of pins, and a second main connector having a second set of pins affixed to the main board, where a direction of lengths of the first set of pins is other than parallel to a direction of lengths of the second set of pins.

In yet another aspect, a computer is provided. The computer includes a main board including a processor, a memory, and a first main connector having a first set of pins. The computer further includes a second main connector having a second set of pins affixed to the main board, where a direction of lengths of the first set of pins is other than parallel to a direction of lengths of the second set of pins.

DETAILED DESCRIPTION OF THE INVENTION

Figure 1:
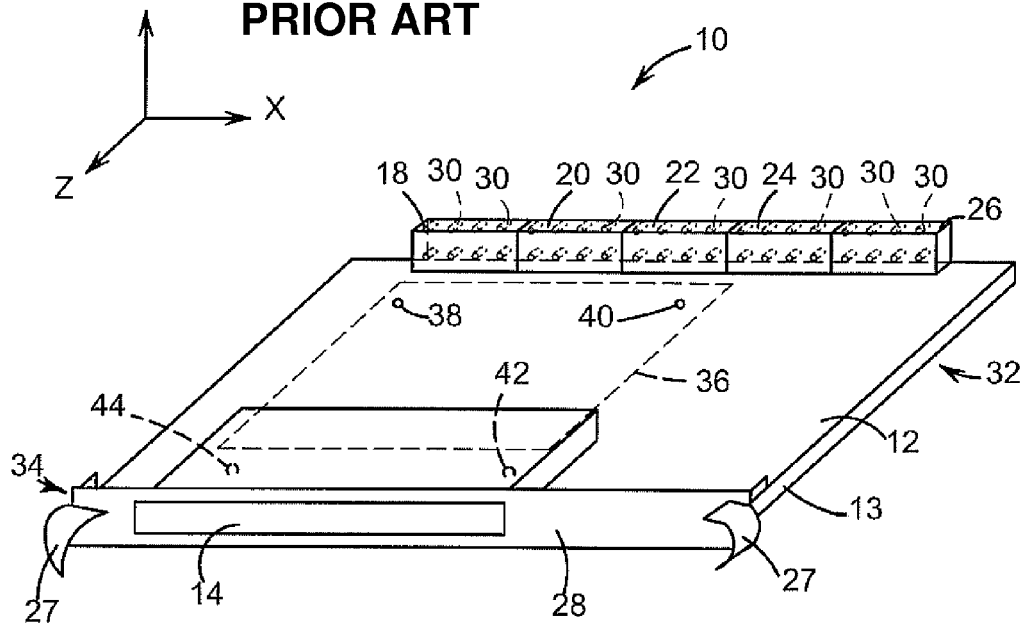
FIG. 1 is an isometric view of an embodiment of a prior art system.

FIG. 1 is an isometric view of a prior art system 10. System 10 includes a base board or a main board 12 having a bottom surface 13. An example of system 10 includes a Pentium universal compact peripheral component interface (PCI) (CompactPCI®) (CPCI) single board computer available from General Electric Fanuc Automation™ Corporation. Another example of system 10 includes a Celeron® M Universal CompactPCI® single board computer available from General Electric Fanuc Automation™ Corporation. System 10 includes an insert 14, and a plurality of main connectors 18, 20, 22, 24, and 26. Insert 14 extends through a front panel 28 of system 10. Each of main connectors 18, 20, 22, 24, and 26 include a plurality of recessed pins 30 and lengths of recessed pins 30 are located parallel to a z-axis. The z-axis is perpendicular to a y-axis and to an x-axis, which is perpendicular to the y-axis. Each pin 30 extends to at least one printed circuit printed on main board 12. A plurality of locking mechanisms 27 are attached to front panel 28. Portions of main connectors 18, 20, 22, 24, and 26 are located at a back side 32 of main board 12, and a portion of insert 14 and front panel 28 are located at a front side 34 of main board 12.

Main connector 26 is a J1 connector, main connector 24 is a J2 connector, main connector 22 is a J3 connector or alternatively can be a Versa Module Europa (VME) P0 (VME P0) connector, main connector 20 is a J4 connector or alternatively can be a VME P0 connector, and main connector 18 is a J5 connector or alternatively can be a VME P0 connector. Each of main connectors 18, 20, and 22 conform to a CompactPCI® standard or alternatively to a VME standard. Moreover, each of main connectors 24 and 26 conform to a CompactPCI® standard. In an alternative embodiment, system 10 includes at least one of main connectors 18, 20, and 22.

Main board 12 includes an expansion site 36 including a plurality of holes or keying pin locations 38, 40, 42, and 44. Lengths of keying pin locations 38, 40, 42, and 44 extend through main board 12 in a direction parallel to the y-axis. In an alternative embodiment, main board 12 includes any number, such as 1, 2, 3, 5, 6, 7, or 8 of keying pin locations.

Figure 2:
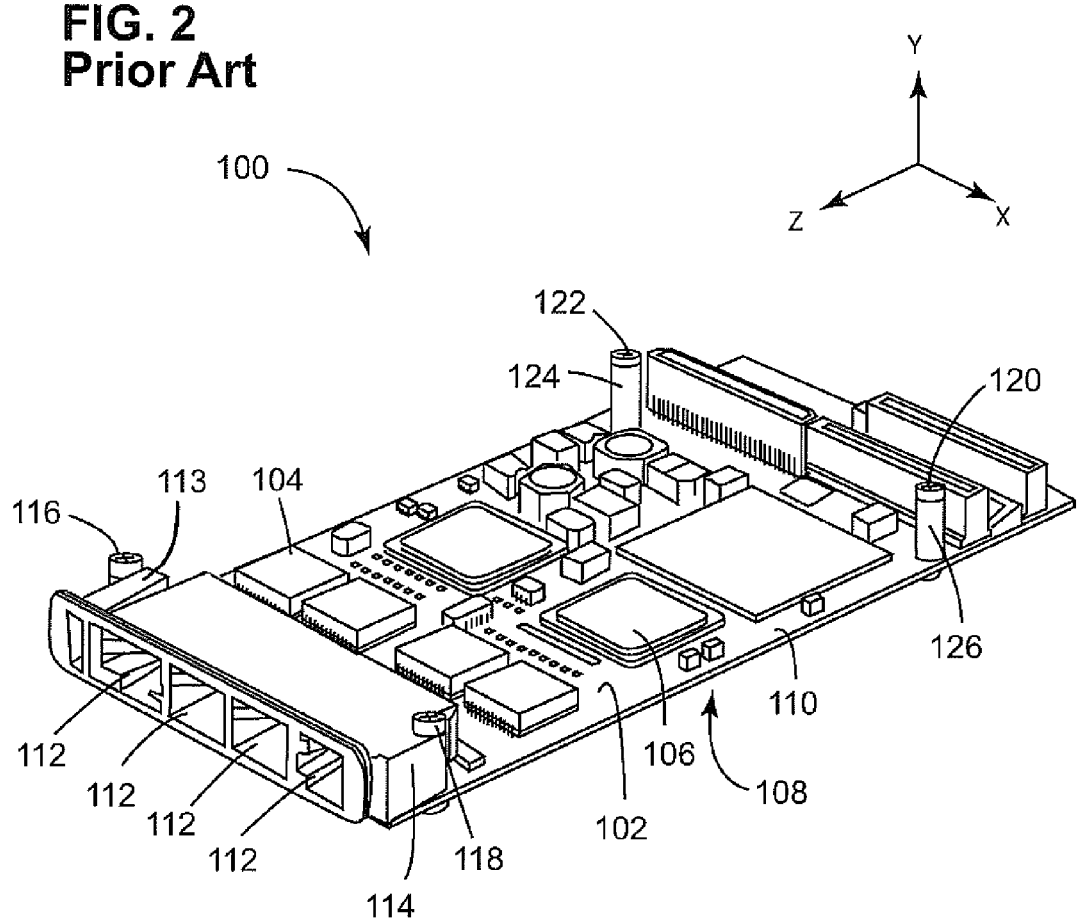
FIG. 2 is an isometric view of an embodiment of a prior art peripheral component interface mezannine card (PMC).

FIG. 2 is an isometric view of an embodiment of a prior art PCI mezannine card (PMC) 100. An example of PMC 100 includes a PMC677 available from General Electric Fanuc™ corporation. The PMC677 is designed to offer a maximum of 1000 megabit full duplex Ethernet connection on four channels. PMC 100 includes a mezannine board 102, an integrated circuit 104, and another integrated circuit 106. Mezannine board 102 has a bottom surface 108 and a top surface 110. Top surface 110 faces a positive y-direction of the y-axis. Bottom surface 108 faces a negative y-direction opposite to the positive y-direction of the y-axis. Alternatively PMC 100 includes any number, such as 1, 2, 3, or 4, of integrated circuits. PMC 100 includes a plurality of PMC connectors 112 used to provide an Ethernet connection to a network of network devices, such as, a computer, a server, a network node, or a cellular phone.

A bezel or housing 114 supports PMC connectors 112 and houses PMC connectors 112. In an alternative embodiment, PMC 100 includes any number, such as 1, 2, or 3, of connectors 112 located within housing 114. A plurality of fasteners 116 and 118, such as screws, mechanically attach housing 114 to top surface 110. Moreover, a plurality of fasteners 120 and 122, such as screws, extend through a plurality of pipes 124 and 126 that are attached, such as glued or soldered, to top surface 110. For example, fastener 120 extends through pipe 126 and mezannine board 102. As another example, fastener 122 extends through pipe 124 and mezannine board 102. In an alternative embodiment, PMC 100 includes less than or higher than four, such as 1, 2, 3, 5, or 6, fasteners. Heads of each fastener 116, 118, 120, and 122 face the positive y-direction.

A user or a person receives PMC 100, removes fasteners 120 and 122 from pipes 124 and 126, and removes fasteners 116 and 118 from housing 114. Moreover, the user removes insert 14. The user rotates PMC 100 around the z-axis so that integrated circuit 104 faces the negative y direction, extends housing 114 through a space, in front panel 28, formed by removing insert 14 and fits a plurality of connectors (not shown) of PMC 100 to a plurality of connectors (not shown) of system to electrically couple PMC 100 with system 10. A type of the connectors and placement of the connectors on the PMC 100 and the PMC expansion site 36 of system 10 are electrically and mechanically defined by Institute of Electrical and Electronic Engineers (IEEE) standard 1386.1. The user mechanically couples PMC 100 with expansion site 36 of system 10 by extending, towards the positive y direction, fasteners 116 and 118 through bottom surface 13 of the main board 12 into the housing 114. As an example, the user mechanically couples a top surface 113 of housing 114 to main board 12 and pipes 124 and 126 of mezannine board 102 with main board 12 by extending fastener 118, toward the positive y direction, through bottom surface 13 and keying pin location 42 of the main board 12 into housing 114 and by extending, towards the positive y direction, fastener 116 through bottom surface 13 and keying pin location 44 of main board 12 into housing 114. The user mechanically couples PMC 100 with expansion site 36 of system 10 by extending fasteners 120 and 122 through bottom surface 13 into pipes 124 and 126. As an example, the user mechanically attaches pipe 126 with main board 12 by extending, towards the positive y direction, fastener 120 through bottom surface 13 and through keying pin location 40 into pipe 126. As another example, the user mechanically attaches pipe 124 with main board 12 by extending fastener 122 through bottom surface 13 and through keying pin location 38 of main board 12 into pipe 124. When PMC 100 is mechanically coupled with expansion site 36, the heads of fasteners 116, 118, 120, and 122 face the negative y-direction.

Figure 3:
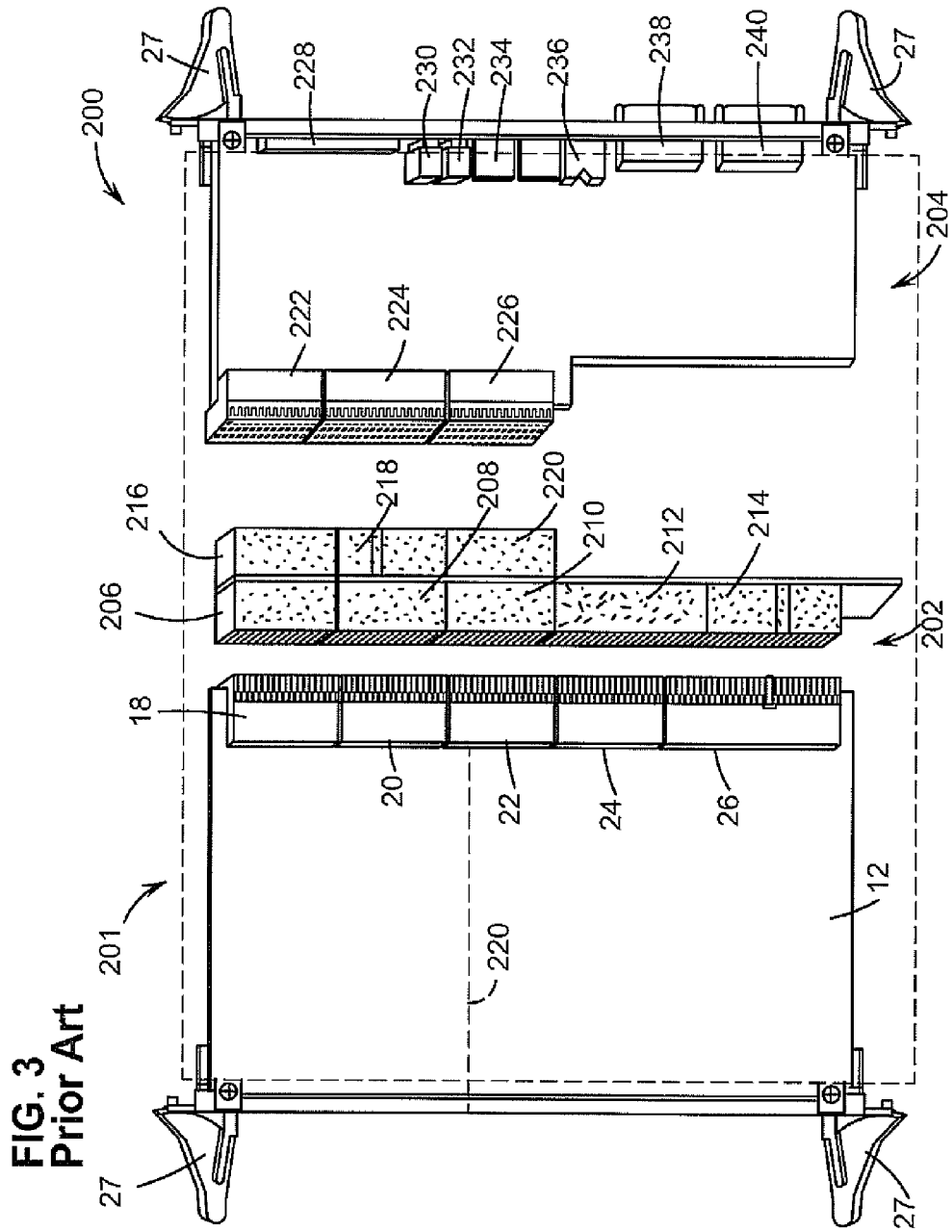
FIG. 3 is a top view of an embodiment of a prior art system.

FIG. 3 is a top view of an embodiment of a prior art system 200. System 200 includes a system 201, a backplane 202 and an accessory card 204. System 201 includes main board 12, main connectors 18, 20, 22, 24, and 26, and locking mechanisms 27. System 201 is an example of system 10. An example of accessory card 204 includes VMIACC-0584 available from General Electric Fanuc™ corporation. Backplane 202 includes a plurality of backplane connectors 206, 208, 210, 212, 214, 216, 218, and 220. System 200 includes a PMC site 220 and expansion site 36 is an example of PMC site 220. Accessory card 204 includes a plurality of accessory card connectors 222, 224, and 226, and a plurality of peripheral connectors 228, 230, 232, 234, 236, 238, and 240. An example of accessory card connector 226 includes a J3 connector, an example of accessory card connector 224 includes a J4 connector, and an example of accessory card connector 222 includes a J5 connector. An example of peripheral connector 228 includes a PMC input/output (I/O) connector, an example of peripheral connector 230 includes a universal serial bus (USB) connector, an example of peripheral connector 232 includes a USB connector, an example of peripheral connector 234 includes a serial advanced technology attachment (SATA) connector, an example of peripheral connector 236 includes a mouse and/or keyboard connector, an example of peripheral connector 238 includes a super video graphics array (SVGA) connector, and an example of peripheral connector 240 includes a COM2 connector. Accessory card 204 also includes a plurality of locking mechanisms 27.

The user mechanically connects backplane connector 206 with main connector 18, backplane connector 208 with main connector 20, backplane connector 210 with main connector 22, backplane connector 212 with main connector 24, and backplane connector 214 with main connector 26. Moreover, the user electrically connects accessory card 204 with backplane 202 by mechanically connecting accessory card connector 222 with backplane connector 216, accessory card connector 224 with backplane connector 218, and accessory card connector 226 with backplane connector 220. The user connects via a cable at least one of a plurality of peripheral devices, such as a mouse, a scanner, a printer, a cathode ray tube (CRT), a keyboard, a digital camera, a modem, to at least one of corresponding peripheral connectors 228, 230, 232, 234, 236, 238, and 240. For example, the user electrically connects an I/O controller of system 200 with a mouse by connecting a cable attached to a mouse with peripheral connector 236. As another example, the user electrically connects the I/O controller of system 200 with a digital camera connected via a cable to peripheral connector 230. The I/O controller of system 200 controls a plurality of I/O signals between a processor of system 200 and one of the peripheral devices connected to a corresponding one of peripheral connectors 228, 230, 232, 234, 236, 238, and 240.

Figure 4:
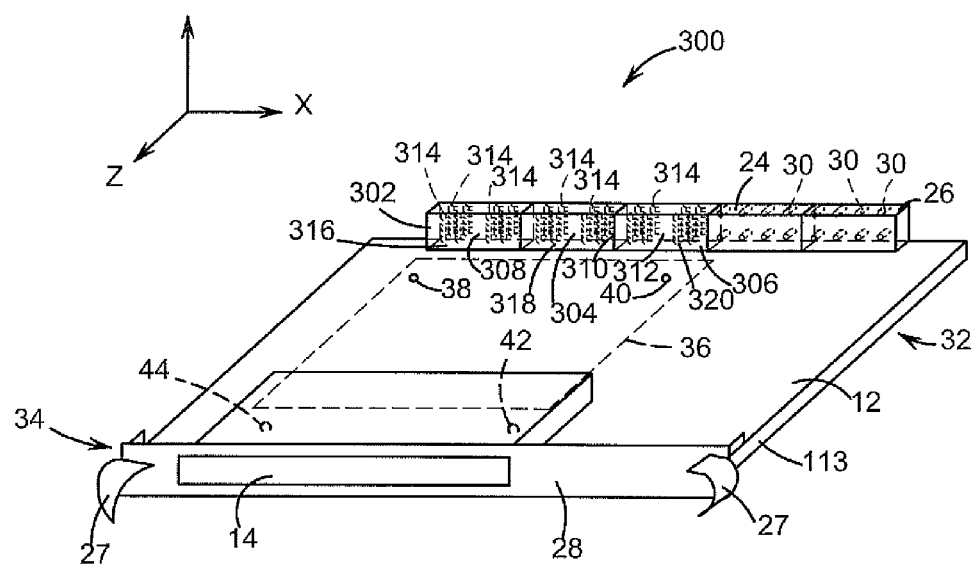
FIG. 4 is an isometric view of an embodiment of a system for converting a computer rear transition input/output (I/O) to front panel I/O.

FIG. 4 is a view of an embodiment of a system 300 for converting a computer rear transition I/O to front panel I/O. System 300 includes main board 12, a plurality of main connectors 302, 304, and 306, main connectors 24 and 26, front panel 28, insert 14, and locking mechanisms 27. Main connector 302 has a housing 308, main connector 304 has a housing 310, and main connector 306 has a housing 312. Each main connector 302, 304, and 306 includes a plurality of recessed pins 314 having lengths that are located parallel to the y-axis. An example of each main connector 302, 304, and 306 includes a connector having a part number SQW-119-01-F-5 available from Semtec™ corporation. Another example of each main connector 302, 304, and 306 includes a connector having a part number SQW-119-01-F-6 available from Semtec™ corporation. Each housing 308, 310, and 312 is attached, such as glued or bolted, to main board 12. In an alternative embodiment, a plurality of mounting brackets are attached, such as bolted or glued, to main board 12 and one of housings 308, 310, and 312 is firmly affixed to a respective one of the mounting brackets. Main board 12 includes keying pin locations 38, 40, 42, and 44.

Lengths of recessed pins 314 of main connectors 302, 304, and 306 are located in a direction perpendicular to a direction of location of lengths of recessed pins 30 of at least one of main connectors 24 and 26 and recessed pins 30 are recessed, from outlets of main connectors 24 and 26, in a positive z-direction opposite to a negative z-direction of the z-axis. Moreover, recessed pins 314 are recessed, from outlets of main connectors 302, 304, and 306, in the negative y-direction. In an alternative embodiment, a direction of recessions of recessed pins 314 from outlets of main connectors 302, 304, and 306 is not perpendicular to a direction of recessions of recessed pins 30 from outlets of main connectors 24 and 26. For example, a direction of recession of recessed pin 314 from an outlet of main connector 306 forms an angle between one degree and ninety degrees with respect to a direction of recession of recessed pin 30 from at least one outlet of main connectors 24 and 26. As another example, a direction of recession of recessed pin 314 from an outlet of main connector 304 forms an angle between one degree and ninety degrees with respect to a direction of recession of recessed pin 30 from at least one outlet of main connectors 24 and 26. The outlets of main connectors 302, 304, and 306 face the positive y-direction and the outlets of main connectors 24 and 26 face the negative z-direction.

The user attaches main connectors 302, 304, and 306 to back side 32 of main board 12 on a plurality of locations 316, 318, and 320 on main board 12 formed by removing main connectors 18, 20, and 22 from back side 32 of main board 12. For example, the user solders recessed pin 314 of main connector 302 to at least one printed circuit or at least one trace integrated within main board 12 to which pin 30 of main connector 18 was soldered. As another example, the user solders recessed pin 314 of main connector 304 to at least one printed circuit integrated within main board 12 to which pin 30 of main connector 20 was soldered. As yet another example, the user solders recessed pin 314 of main connector 306 to at least one printed circuit integrated within main board 12 to which pin 30 of main connector 22 was soldered. As still another example, the user attaches main connector 302 to main board 12 on location 316 on main board 12 formed by removing main connector 18 from main board 12 and attaches main connector 302 to location 316. For example, the user solders recessed pin 314 of main connector 302 to at least one printed circuit integrated within main board 12 to which pin 30 of main connector 18 was soldered at location 316. As yet another example, the user attaches main connector 304 to main board 12 on location 318 on main board 12 formed by removing main connector 20 from main board 12 and attaches main connector 304 to location 318. As another example, the user attaches main connector 306 to main board 12 on location 320 on main board 12 formed by removing main connector 22 from main board 12 and attaches main connector 306 to location 320. Each recessed pin 314 extends to and is electrically coupled to at least one printed circuit printed on main board 12.

Figure 5:
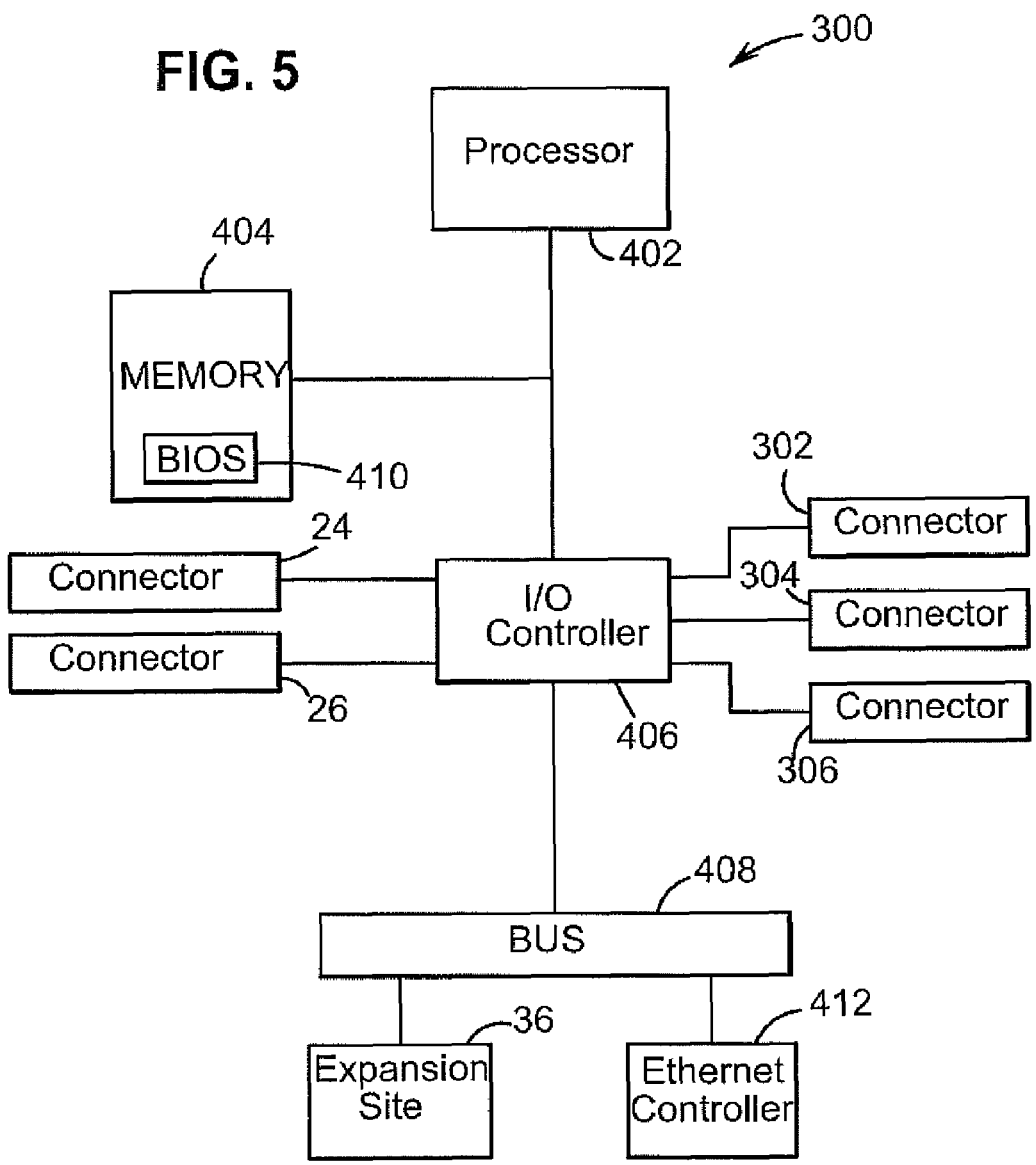
FIG. 5 is a block diagram of an embodiment of the system of FIG. 4.

FIG. 5 is a block diagram of an embodiment of system 300. System 300 includes a processor 402, a memory device 404, an I/O controller 406, main connectors 302, 304, 306, 24, and 26, a bus 408, expansion site 36, a basic I/O system (BIOS 410) 410, and an Ethernet controller 412. Each of I/O controller 406, memory device 404, bus 408, and Ethernet controller 412 are integrated with main board 12. Bus 408 can be a 64 bit 66 megahertz (MHz) PCI bus 408 or alternatively a gigabyte per second 133 MHz bus. I/O controller 406 can be a 6300ESB I/O controller hub available from Intel® corporation or an 82801BA I/O controller hub 2 available from Intel™ corporation. Ethernet controller 412 can be an 82546EB dual Ethernet controller available from Intel® corporation or an 82559 10/100 megabits per second fast Ethernet controller available from Intel® corporation. Alternatively, I/O controller 406 can be directly coupled to expansion site 36 instead of via bus 408.

As used herein, the term processor is not limited to just those integrated circuits referred to in the art as a processor, but broadly refers to a controller, a computer, a microprocessor, a microcontroller, a microcomputer, a programmable logic controller, an application specific integrated circuit, and other programmable circuits. An example of processor 402 includes a Pentium® M processor available from Intel® corporation. Another example of processor 402 includes a Celeron® M processor available from Intel® corporation. Examples of memory device 404 include a random access memory (RAM) and a read-only memory (ROM).

BIOS 410 is a software code run by processor 402 when processor 402 is powered on during boot up. BIOS 410 causes processor 402 to load an operating system, such as a Windows® operating system, a Linux® operating system, a VxWorks® operating system, and a QNX® operating system that is stored in the ROM in memory device 404. Once the operating system is executed by processor 402, processor 402 can execute various application processes, such as Microsoft® Excel, Microsoft® Word, Microsoft® Outlook, and Microsoft® Powerpoint. I/O controller 406 controls a transfer of data between processor 402 and the peripheral devices connected via main connectors 302, 304, and 306 to processor 402. For example, I/O controller 406 compensates, such as, by buffering, a difference between a speed of operation of processor 402 and a speed of operation of one of the peripheral devices transferring data to processor 402 via I/O controller 406.

Ethernet controller 412 provides access to the user to the network. Ethernet controller 412 includes a plurality of components for transmitting and/or receiving signals on the network allowing processor 402 to communicate with other processors. Ethernet controller 412 can be a network switch that implements an Ethernet switching protocol. According to the Ethernet protocol, the network operates at 10 or 100 megabits per second. Ethernet is a standard in computer networking. Each of main connectors 302, 304, and 306 are electrically coupled to main board 12 by soldering pins to at least one printed circuit integrated with main board 12 and the at least one printed circuit of main board 12 is electrically connected to I/O controller 406.

Figure 6:
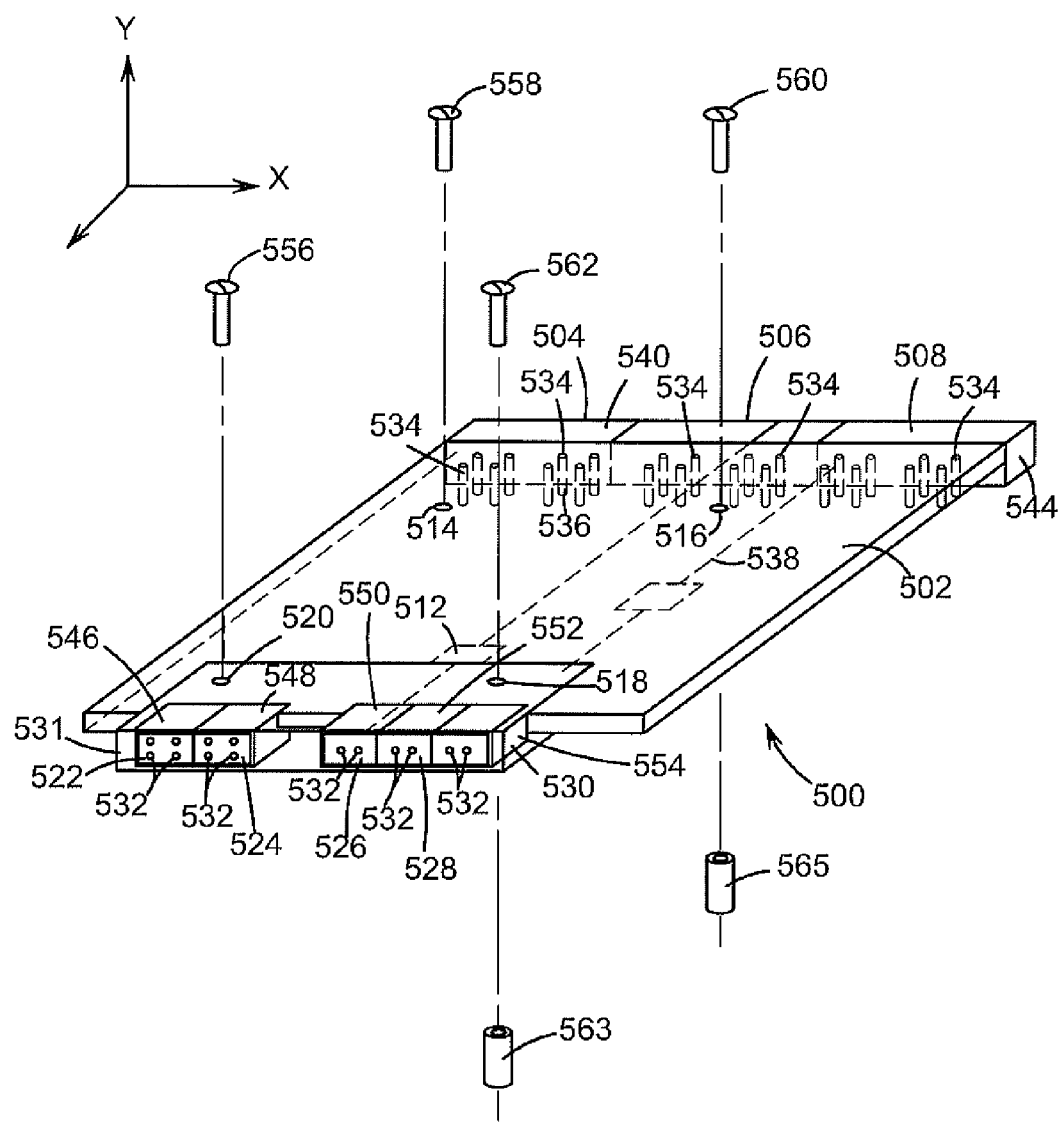
FIG. 6 is an isometric view of another embodiment of a system for converting a computer rear transition I/O to front panel I/O.

FIG. 6 is an isometric view of an embodiment of a system 500 for converting a computer rear transition I/O to front panel I/O. System 500 includes mezannine board 502, a plurality of mezannine connectors 504, 506, and 508, an integrated circuit 510, an integrated circuit 512, a plurality of mezannine holes or mezannine keying pin locations 514, 516, 518, and 520, a plurality of peripheral connectors 522, 524, 526, 528, and 530, and a frame, housing, or bezel 531. Bezel 531 reduces electromagnetic interference (EMI) between system 500 and other devices by creating an electromagnetic shield between system 500 and the other devices. Keying pin locations 518 and 520 extend through bezel 531. Each peripheral connector 522, 524, 526, 528, and 530 includes a plurality of peripheral recessed pins 532 recessed within or from outlets of peripheral connectors 522, 524, 526, 528, and 530. For example, peripheral recessed pin 532 of peripheral connector 522 is recessed within peripheral connector 522. Moreover, each mezannine connector 504, 506, and 508 includes a plurality of mezannine protruding pins 534 protruding from outlets of mezannine connectors 504, 506, and 508. For example, mezannine protruding pin 534 of mezannine connector 506 protrudes from an outlet of mezannine connector 506. The outlets of peripheral connectors 522, 524, 526, 528, and 530 face the positive z-direction. The outlets of mezannine connectors 504, 506, and 508 face the negative y-direction. An example of each of peripheral connectors 522, 524, 526, 528, and 530 includes any one of peripheral connectors 228, 230, 232, 234, 236, 238, and 240. For example, peripheral connector 522 can be peripheral connector 230. As another example, peripheral connector 524 can be peripheral connector 234. Each peripheral connector 522, 524, 526, 528, and 530 is connected via a cable to one of the peripheral devices. For example, peripheral connector 524 can be a mouse connector that is electrically connected via a cable to a mouse. As another example, peripheral connector 526 can be a USB connector that is connected via a cable to a digital camera or alternatively to a memory card reader. An example of each mezannine connector 504, 506, and 508 includes a connector having a part number TW-19-11-L-S-143-110 available from Semtec™ corporation. Another example of each mezannine connector 504, 506, and 508 includes a connector having a part number TW-19-11-L-S-152-110 available from Semtec™ corporation. An example of each of integrated circuits 510 and 512 includes at least one of an amplifier and a filter.

Mezannine board 502 includes a plurality of traces or a plurality of mezannine printed circuits including mezannine printed circuits 536 and 538. The mezannine printed circuits of mezannine board 502 couple mezannine protruding pins 534 of mezannine connectors 504, 506, and 508 to peripheral connectors 522, 524, 526, 528, and 530. For example, mezannine printed circuit 538 electrically connects mezannine protruding pin 534 to peripheral recessed pin 532 via integrated circuit 510. As another example, mezannine printed circuit 536 electrically connects mezannine protruding pin 534 to peripheral recessed pin 532 via integrated circuit 512. In an alternatively embodiment, each mezannine connector 504, 506, and 508 includes a higher or a lower number, such as 40, 6, 10, of mezannine protruding pins 534. A number of mezannine protruding pins 534 of a mezannine connector matches a number of recessed pins 314 in a main connector that electrically connects to the mezannine connector. For example, a number of mezannine protruding pins 534 in mezannine connector 504 is equal to a number of recessed pins 314 in main connector 302 that electrically couples to mezannine connector 504. As another example, a number of mezannine protruding pins 534 in mezannine connector 506 is equal to a number of recessed pins 314 in main connector 304 that electrically couples to mezannine connector 506. As yet another example, a number of mezannine protruding pins 534 in mezannine connector 508 is equal to a number of recessed pins 314 in main connector 306 that electrically couples to mezannine connector 508. Each mezannine protruding pin 534 and each peripheral protruding pin 534 extends to mezannine board 502.

Moreover, in an alternative embodiment, each of peripheral connectors 522, 524, 526, 528, and 530 include a higher of alternatively a lower number, such as 12, 14, or 3, of peripheral recessed pins 532. A number of peripheral recessed pins 532 of each peripheral connector 522, 524, 526, 528, and 530 conforms to a particular standard. For example, peripheral connector 522 can be a USB connector that conforms to a USB Implementers Forum (USB-IF) standard. As another example, peripheral connector 524 can be an SVGA connector that conforms to an SVGA standard. The user attaches, such as solders, each peripheral recessed pin 532 to the mezannine printed circuits of mezannine board 502. For example, the user solders peripheral recessed pin 532 to mezannine printed circuit 538. The user fits a mezannine protruding pin of a mezannine connector within a mezannine housing of the mezannine connector. For example, the user fits mezannine protruding pin 534 of mezannine connector 504 within a mezannine housing 540 of mezannine connector 504. As another example, the user fits mezannine protruding pin 534 of mezannine connector 506 within a mezannine housing 542 of mezannine connector 506. As yet another example, the user fits mezannine protruding pin 534 of mezannine connector 508 within a mezannine housing 544 of mezannine connector 508. The user attaches, such as glues or bolts, each mezannine housing 540, 542, and 544 to mezannine board 502.

A length of mezannine protruding pin 534 of a mezannine connector is parallel to a length of a protruding pin of a main connector that couples to the mezannine connector. For example, a length of mezannine protruding pin 534 of mezannine connector 504 is parallel to a length of recessed pin 314 of main connector 302 that couples to mezannine connector 502. As another example, a length of mezannine protruding pin 534 of mezannine connector 506 is parallel to a length of recessed pin 314 of main connector 304 that couples to mezannine connector 506. As yet another example, a length of mezannine protruding pin 534 of mezannine connector 508 is parallel to a length of recessed pin 314 of main connector 306 that couples to mezannine connector 508. A length of each peripheral recessed pin 532 is parallel to the z-axis. In an alternative embodiment, a length of each peripheral recessed pin 532 forms an angle ranging between 0 degrees and 179 degrees with respect to the z-axis.

Each peripheral connector 522, 524, 526, 528, and 530 has a peripheral housing. For example, peripheral connector 522 includes a peripheral housing 546, peripheral connector 524 includes a peripheral housing 548, peripheral connector 526 includes a peripheral housing 550, peripheral connector 528 includes a peripheral housing 552, and peripheral connector 530 includes a peripheral housing 554. The user attaches, such as bolts, peripheral housings 546, 548, 550, 552, and 554 to mezannine board 502. In an alternative embodiment, system 500 includes a lower or a higher number, such as 2, 3, 4, 7, or 8, of peripheral connectors.

The user couples system 300 to system 500 by removing insert 14 from front panel 28 to create a space within front panel 28. Moreover, the user couples system 300 to system 500 by coupling mezannine connector 504 with main connector 302, coupling mezannine connector 506 with main connector 304, and coupling mezannine connector 508 with main connector 306. For example, the user mechanically and electrically couples mezannine protruding pins 534 of mezannine connector 504 with recessed pins 314 of main connector 302, mezannine protruding pins 534 of mezannine connector 506 with recessed pins 314 of main connector 304, and mezannine protruding pins 534 of mezannine connector 508 with recessed pins 314 of main connector 306. It is noted that in an alternative embodiment, if system 300 includes one of main connectors 302, 304, and 306 and system 500 includes one mezannine connector, the user couples the one of the main connectors 302, 304, and 306 to the mezannine connector by coupling recessed pins 314 of one of the main connectors 302, 304, and 306 with mezannine protruding pins 534 of the mezannine connector. For example, if system 300 includes main connector 302 and does not include main connectors 304 and 306, and system 500 includes mezannine connector 504 and does not include mezannine connectors 506 and 508, the user couples the main connector 302 with mezannine connector 504 by coupling recessed pins 314 of main connector 302 with mezannine protruding pins 534 of mezannine connector 504. It is noted that in another alternative embodiment, if system 300 includes two of main connectors 302, 304, and 306 and system 500 includes two mezannine connectors, the user couples the two of the main connectors 302, 304, and 306 to the mezannine connectors by coupling recessed pins 314 of one of the two of the main connectors 302, 304, and 306 with mezannine protruding pins 534 of one of the two mezannine connectors and by coupling recessed pins 314 of the remaining one of the two of the main connectors 302, 304, and 306 with mezannine protruding pins 534 of the remaining one of the two mezannine connectors. For example, if system 300 includes main connectors 302 and 304 and does not include main connector 306, and system 500 includes mezannine connectors 504 and 506, and does not include mezannine connector 508, the user couples main connector 302 with mezannine connector 504 by coupling recessed pins 314 of main connector 302 with mezannine protruding pins 534 of mezannine connector 504 and couples main connector 304 with mezannine connector 506 by coupling recessed pins 314 of main connector 304 with mezannine protruding pins 534 of mezannine connector 506.

Furthermore, the user couples system 300 with system 500 by extending bezel 531 and peripheral connectors 522, 524, 526, 528, and 530 through the space formed by removing insert 14. The user uses a plurality of fasteners 555, 556, 557, 558, 559, 560, 561, and 562, such as screws, and a plurality of pipes 563 and 565, to mechanically couple system 300 with system 500. For example, the user extends, towards the negative y direction, fastener 558 via mezannine keying pin location 514 and extends, towards the positive y-direction, fastener 557 via keying pin location 38 to fit pipe 563 between main board 12 and mezzanine board 502. As another example, the user extends, towards the negative y direction, fastener 560 via mezannine keying pin location 516 and extends, towards the positive y direction, fastener 559 via keying pin location 40 to fit pipe 565 between mezzanine board 502 and main board 12. Fastener 557 is located behind, along the x-axis, fastener 559 and is not visible in FIG. 7. Moreover, the user mechanical couples system 300 with system 500 by extending, towards the positive y direction, fasteners 555 and 561 through bottom surface 13 of the main board 12 into the bezel 531. Moreover, the user mechanically couples system 300 with system 500 by extending, towards the negative y direction, fasteners 556 and 562 through bezel 531 and mezannine board 502 into bezel 531. Fastener 555 is located behind, along the x-axis, fastener 561 and is not visible in FIG. 7. If fasteners 555, 556, 561, and 562 are screws having threads, bezel 531 has threads that complement the threads of the fasteners 555, 556, 561, and 562. Moreover, if fasteners 557 and 558 are screws having threads, pipe 563 has threads that complement the threads of fasteners 557 and 558. Additionally, if fasteners 559 and 560 are screws having threads, pipe 565 has threads that complement the threads of fasteners 559 and 560.

The user mechanically couples system 300 with system 500 to electrically couple mezannine connector 504 to main connector 302 via mezannine protruding pins 534 and recessed pins 314 and to electrically couple main connector 302 to one of peripheral connectors 522, 524, 526, 528, and 530 via at least one of the mezannine printed circuits, via peripheral pins 532, and via mezannine protruding pins 534. For example, the user connects peripheral recessed pins 532 of peripheral connector 522 to recessed pins 314 of main connector 302 via at least one the mezannine printed circuits, via a plurality of integrated circuits coupled to the mezannine printed circuits, and via mezannine protruding pins 534 of mezannine connector 504. Moreover, the user mechanically couples system 300 with system 500 to electrically couple mezannine connector 506 to main connector 304 via mezannine protruding pins 534 and recessed pins 314 and to electrically couple main connector 304 to one of peripheral connectors 522, 524, 526, 528, and 530 via at least one of the mezannine printed circuits, via peripheral pins 532, and via mezannine protruding pins 534. Furthermore, the user mechanically couples system 300 with system 500 to electrically couple mezannine connector 508 to main connector 306 via mezannine protruding pins 534 and recessed pins 314 and to electrically couple main connector 306 to one of peripheral connectors 522, 524, 526, 528, and 530 via at least one of the mezannine printed circuits, via peripheral pins 532, and via mezannine protruding pins 534.

The user electrically couples one of the peripheral devices via a cable and an opening in bezel 531 to a corresponding one of peripheral connectors 522, 524, 526, 528, and 530. For example, the user connects a digital camera via a cable to a USB connector connected to mezannine board 502. As another example, the user couples a mouse to a mouse connector connected to mezannine board 502. Upon coupling one of the peripheral devices to one of peripheral connectors 522, 524, 526, 528, and 530, the user electrically couples I/O controller 406 to one of the peripheral devices via a cable connected to the one of the peripheral devices, via a connector coupled to the cable and having a plurality of pins to mate with peripheral recessed pins 532 of the one of the peripheral connectors 522, 524, 526, 528, and 530, via at least one mezannine printed circuit on mezannine board 502, via a plurality of mezannine protruding pins 534 of one of mezannine connectors 504, 506, and 508, and via a plurality of recessed pins 314 of one of main connectors 302, 304, and 306. It is noted that in an alternative embodiment, mezannine board 502 does not include integrated circuits 510 and 512.

Figure 7:
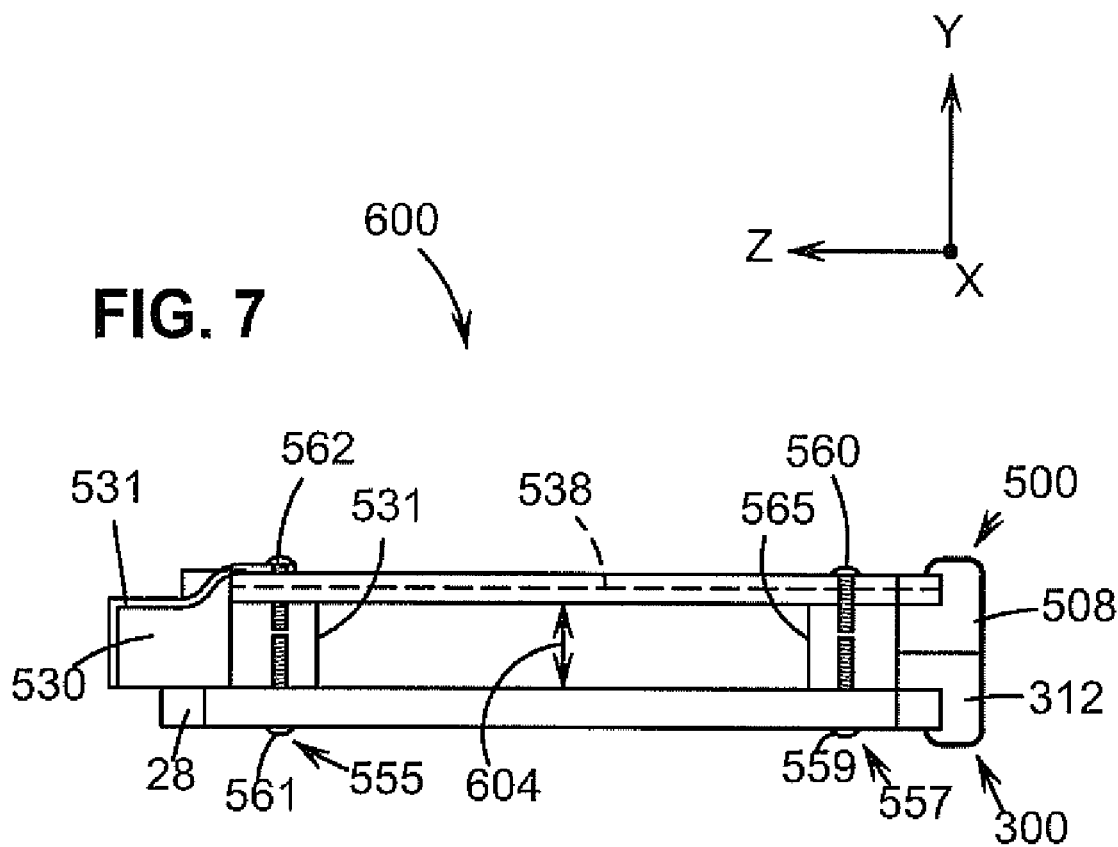
FIG. 7 is a right-hand side view of an embodiment of a system including the systems of FIGS. 4-6.

FIG. 7 is a right-hand side view of an embodiment of a system 600 including systems 300 and 500. When system 300 is coupled to system 500, a space 602 is formed between mezannine board 502 and main board 12. Space 602 has a vertical distance 604, parallel to the y-axis, ranging from and including 9 millimeters (mm) to 11 mm. When main connector 302 is electrically and mechanically connected to mezannine connector 504, main connector 304 is electrically and mechanically connected to mezannine connector 506, and main connector 306 is electrically and mechanically connected to mezannine connector 508, vertical distance 604 ranges from and including 9 mm to 11 mm.

Figure 8:
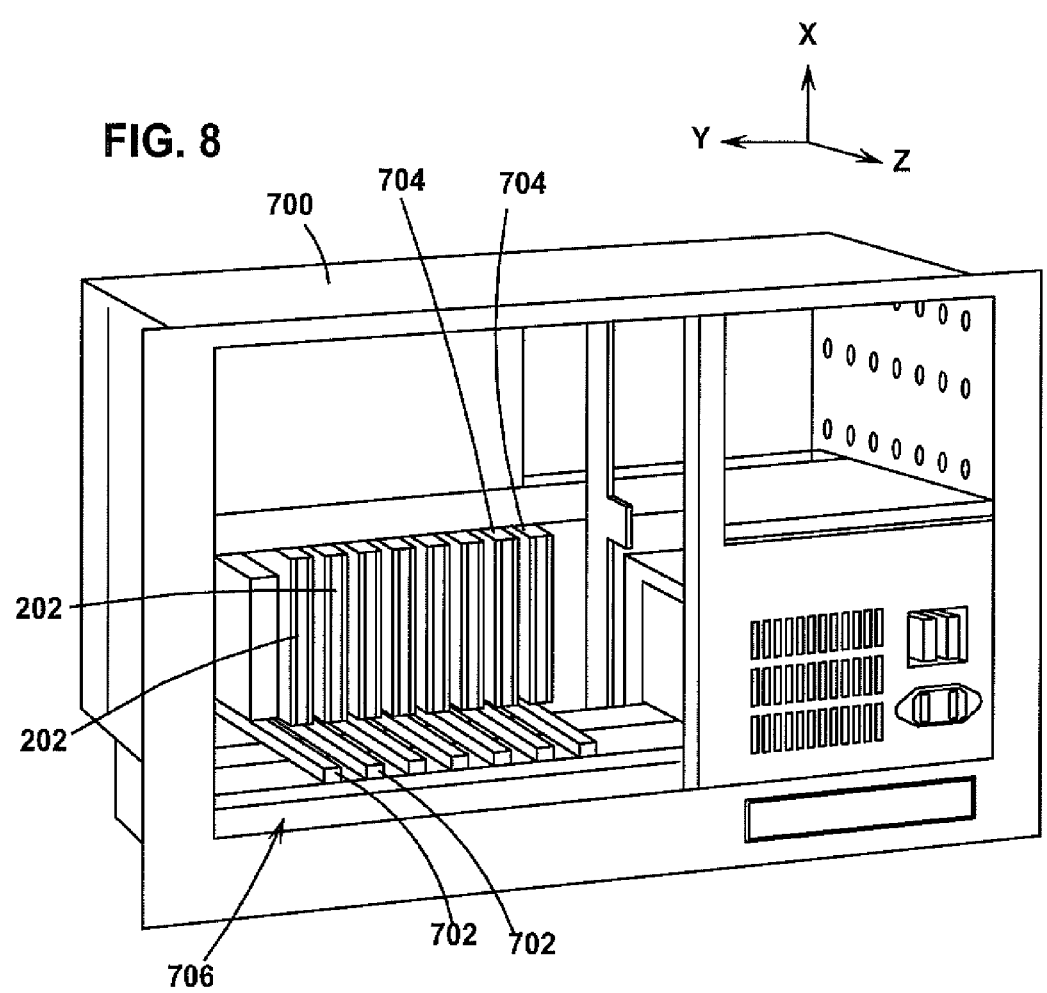
FIG. 8 is an isometric view of an embodiment of a chassis or a card cage that includes the system of FIG. 7.

FIG. 8 is an isometric view of an embodiment of a chassis 700 or a card cage. An example of chassis 700 includes an SC-784TD08F01 card cage available from SBS™ Technologies corporation. Another example of chassis 700 includes an SC-784TE08000 card cage available from SBS™ Technologies corporation. Chassis 700 includes a plurality of backplanes 202, a plurality of slots 702, and a plurality of accessory cards 704. In an alternative embodiment, chassis 700 includes a higher or a lower number, such as 4, 5, 10, or 12 of slots. In yet another alternative embodiment, chassis 700 includes a higher or a lower number, such as 4, 5, 10, or 12 of accessory cards 704. An example of each accessory card 704 includes accessory card 204. Another example of each accessory card 704 includes a card having at least one of a J3, J4, and J5 connector and at least one of a USB connector, a SATA connector, a mouse connector, an SVGA connector, a COM2 port, and a PMC I/O connector.

The user removes accessory cards 704 from chassis 700, inserts system 600 into slot 702, and upon insertion of system 600 into slot, electrically couples system 600 with a power supply (not shown) of chassis 700. Alternatively, the user couples system 300 with system 500 and then inserts system 600 into slot. The user electrically connects one of the peripheral devices to a corresponding one of peripheral connectors 522, 524, 526, 528, and 530 via a front portion 706, of chassis 700, facing the positive z-direction. The user couples system 600 to chassis 700 via locking mechanisms 27. Processor 402 is powered by the power supply within chassis 700.

Technical effects of the herein described systems and methods for converting a computer rear transition input/output (I/O) to front panel I/O include providing system 600 that connects the peripheral devices to I/O controller 406 via front panel 28 on front side 34 rather than via main connectors 20, 22, and 24 located on back side 32 of main board 12. A plurality of customers of an entity may not desire to occupy a backspace within chassis 700 with accessory cards 704 for a variety of reasons, such as saving space. The peripheral devices couple to I/O controller 406 via front portion 706 and reduce the backspace within chassis 700 to reduce space and costs associated with the backspace.

While the invention has been described in terms of various specific embodiments, those skilled in the art will recognize that the invention can be practiced with modification within the spirit and scope of the claims.

What is claimed is:

1. A system for converting a computer rear transition input/output (I/O) to front panel I/O, said system comprising:
   a main board having a first main connector having a first set of pins, a direction of lengths of the first set of pins being configured to extend along a first x-axis; and
   a second main connector having a second set of pins, a direction of lengths of the second set of pins being configured to extend along a second x-axis, the second main connector being affixed to the main board;
   wherein a first y-axis relative to the first x-axis is other than parallel to a second y-axis relative to the second x-axis; and
   wherein one of the first or the second main connectors is configured to route an I/O signal from the rear transition I/O to a connector on the front panel I/O for connection of a cable at the front panel, and wherein the first set of pins and the second set of pins are configured to conductively communicate with the main board.

2. A system in accordance with claim 1, wherein said first main connector is one of a compact peripheral component interface (CPCI) J1 connector and a CPCI J2 connector.

3. A system in accordance with claim 1, wherein a processor is integrated within the main board.

4. A system in accordance with claim 1, wherein the direction of lengths of the first set of pins is perpendicular to the direction of lengths of the second set of pins.

5. A system in accordance with claim 1 further comprising:
   a mezannine board; and
   a mezannine connector coupled to the mezannine board, wherein said mezannine connector is electrically connected to the second main connector.

6. A system in accordance with claim 1 further comprising:
   a mezannine board;
   a mezannine connector coupled to the mezannine board, wherein said mezannine connector is electrically connected to the second main connector; and
   an expansion site configured to receive said mezannine board, wherein said expansion site is configured to mechanically couple to a PCI mezannine card (PMC).

7. A computer comprising:
   a main board including a processor, a memory, and a first main connector having a first set of pins, a direction of lengths of the first set of pins being configured to extend along a first x-axis; and
   a second main connector having a second set of pins, a direction of lengths of the second set of pins being configured to extend along a second x-axis, the second main connector being affixed to the main board, wherein a first y-axis relative to the first x-axis is other than parallel to a second y-axis relative to the second x-axis, and wherein one of the first or the second main connectors is configured to route an I/O signal from the rear transition I/O to a connector on the front panel I/O for connection of a cable at the front panel, wherein the first set of pins and the second set of pins are configured to conductively communicate with the main board.

8. A system in accordance with claim 7, wherein said first main connector is one of a compact peripheral component interface (CPCI) J1 connector and a CPCI J2 connector.

9. A system in accordance with claim 7, wherein a processor is integrated within the main board.

10. A system in accordance with claim 7, wherein the direction of lengths of the first set of pins is perpendicular to the direction of lengths of the second set of pins.

* * * * *